(12) United States Patent
You et al.

(10) Patent No.: US 9,792,524 B1
(45) Date of Patent: Oct. 17, 2017

(54) GAP SHIFTING FOR AUTOMATIC RECOGNITION OF TABULAR TEXT

(71) Applicant: Amazon Technologies, Inc., Seattle, WA (US)

(72) Inventors: Wei You, Redmond, WA (US); Dirk Ryan Padfield, Seattle, WA (US); Gurumurthy Swaminathan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/805,775

(22) Filed: Jul. 22, 2015

(51) Int. Cl.
  *G06K 9/62* (2006.01)
  *G06K 9/42* (2006.01)

(52) U.S. Cl.
  CPC ............. *G06K 9/6203* (2013.01); *G06K 9/42* (2013.01)

(58) Field of Classification Search
  CPC ............................... G06K 9/6203; G06K 9/42
  USPC ........................................................ 382/229
  See application file for complete search history.

(56) References Cited

U.S. PATENT DOCUMENTS

| | | | | |
|---|---|---|---|---|
| 6,874,122 B1* | 3/2005 | Bates | ................. | G06F 17/2247 715/236 |
| 8,175,388 B1* | 5/2012 | Fisher | ................. | G06K 9/3208 382/176 |
| 2003/0105681 A1* | 6/2003 | Oddo | ..................... | G06Q 30/02 705/26.62 |
| 2006/0218496 A1* | 9/2006 | Kunori | ................. | G06F 3/1204 715/210 |
| 2013/0218913 A1* | 8/2013 | Bart | ................. | G06F 17/30339 707/755 |

* cited by examiner

*Primary Examiner* — Amandeep Saini
(74) *Attorney, Agent, or Firm* — Thomas| Horstemeyer, LLP

(57) ABSTRACT

Disclosed are various embodiments for improving optical character recognition approaches through the use of gap shifting. A text detection process is performed upon an image to detect a first region of text. A second region that is in line with the first region is shifted to reduce a gap between the first region and the second region, thereby creating a modified image. The text detection process is performed upon the modified image in order to detect text within the second region.

20 Claims, 5 Drawing Sheets

103

106

100

GAP SHIFTING FOR AUTOMATIC RECOGNITION OF TABULAR TEXT

BACKGROUND

Optical character recognition (OCR) refers to a process of electronically extracting text from images. The images may correspond to scanned versions of printed matter, such as book pages, magazine pages, newspaper articles, invoices, account statements, business cards, or other printed text. The quality of OCR has improved over the years. While early versions of OCR required the use of special fonts, current versions of OCR can recognize text in most fonts with a high degree of accuracy. However, problems with OCR persist for certain types of documents.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to optical character recognition (OCR) and, specifically, the use of a gap-shifting approach to improve OCR of text in a tabular form. While the accuracy of OCR has continually improved, problems persist relating to the detection of tabular text, or text arranged in rows or columns. For instance, a table row may have certain text that is left justified (i.e., a first column) and certain text that is right justified (i.e., a second column). A gap may exist between the left-justified text and the right-justified text. A text detection engine operating left to right on the given row may fail to detect the right-justified text, particularly if the gap between the left-justified text and the right-justified text is relatively large or if the right-justified text is relatively small. Ultimately, the right-justified text may not be provided to a text recognition engine because it was overlooked in the detection stage.

Various embodiments of the present disclosure improve the accuracy of OCR in this and other situations by shifting text to be nearer to the other text in the row. As a result of this process, in the foregoing non-limiting example, the gap between the left-justified text and the right-justified text is for the most part shifted to the other side of the right-justified text. The text detection engine is executed again on the manipulated image, and this time, the text detection engine is able to detect the formerly missed text, which can then be provided to the text recognition engine for recognition. Furthermore, the amount of gap shifting can be recorded and used to reconstruct the tabular structure using the recognized text. It is noted that in other examples gaps may be shifted to the left instead of the right, and text that shifted need not be right justified.

Figure 1:
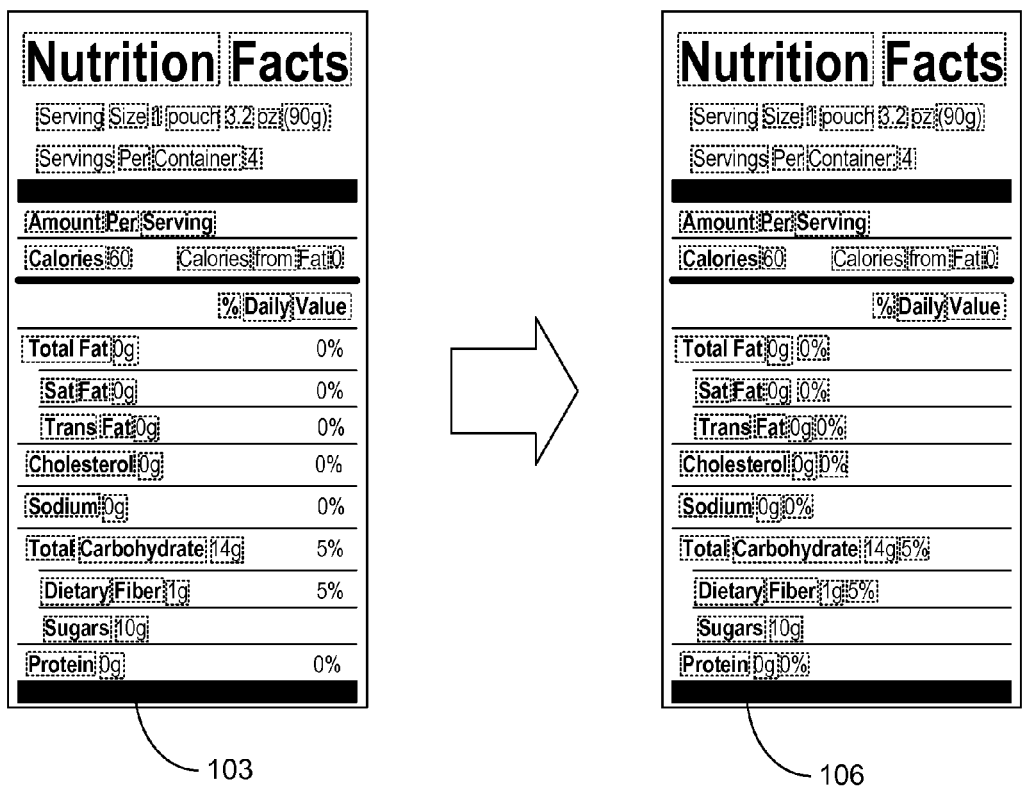
FIG. 1 is a pictorial diagram illustrating two stages of text detection according to an embodiment of the present disclosure.

Turning now to FIG. 1, shown is a pictorial diagram 100 illustrating two stages of text detection according to an embodiment of the present disclosure. Image 103 corresponds to an initial application of a text detection process to a raster image of an example "Nutrition Facts" label. Such a label may be acquired via scanning or taking a photo of food packaging. The "Nutrition Facts" label is one example of tabular data for which text detection approaches have difficulty in recognizing all the text that is present. As shown in image 103, various rows of the tabular data include left-justified text and right-justified text. Here, "Trans Fat 0 g" is left justified, while "0%" is right justified. In other examples, columns that are left justified, centered, or right justified may be used.

Each block of text that is recognized by the text detection approach applied to image 103 is shown with a dotted region. While the left-justified text is detected, much of the right-justified text is not (i.e., "0%" and "5%"). This is due both to the width of the right-justified text being relatively narrow (cf., "Calories From Fat: 0" is recognized as it is wider than "0%") and that the right-justified text is relatively far from the left-justified text (cf., "0 g" is recognized as it is relatively close to "Total Fat"). Text that is not detected by the text detection approach is typically not provided as an input to a text recognition process that follows. For instance, the non-detected text may be regarded similarly as an image, a graphical element, or any non-text artifact. In the case of the "Nutrition Facts" label, the omitted text could be regarded as very significant for a reader's understanding of the food contents as it pertains to a recommended daily value percentage.

Image 106 shows the result of a gap-shifting process applied to the image 103 and a subsequent application of a text detection process. In the image 106, the right-justified percentages have been linearly shifted to the left, thereby narrowing the gap between the left-justified text and the percentages. After shifting, the text detection process is repeated. This time, the percentages have been detected, as indicated by the dotted regions. Each of the dotted regions may then be submitted for evaluation by a text recognition process.

Experimental results from the operation of an example implementation show a significant reduction in missed text. For example, with respect to a sample set of "Nutrition Facts" images, the addition of gap shifting has resulted in a reduced missing detection rate from 32% to 23%.

In the following discussion, a general description of the system and its components is provided, followed by a discussion of the operation of the same.

Figure 2:
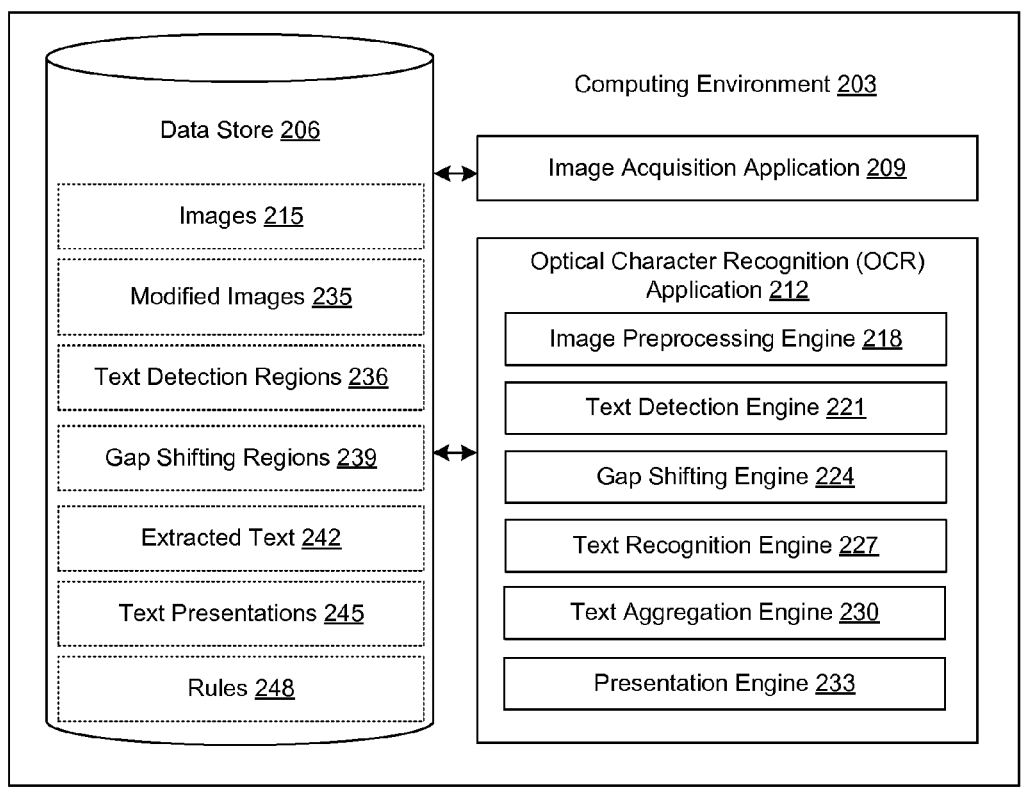
FIG. 2 is a schematic block diagram of a computing environment according to various embodiments of the present disclosure.

With reference to FIG. 2, shown is a computing environment 203 according to various embodiments. The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 206 that is accessible to the computing environment 203. The data store 206 may be representative of a plurality of data stores 206 as can be appreciated. The data stored in the data store 206, for example, is associated with the operation of the various applications and/or functional entities described below.

The components executed on the computing environment 203, for example, include an image acquisition application 209, an optical character recognition (OCR) application 212, and other applications, services, processes, systems, engines, or functionality not discussed in detail herein. The image acquisition application 209 is executed to acquire images 215 for processing by the OCR application 212. To this end, the image acquisition application 209 may acquire images 215 via specialized hardware in the computing environment 203 such as a camera, a scanner, etc. For example, products bearing "Nutrition Facts" labels may be loaded onto a conveyor, and images 215 may be captured automatically by scanners or cameras positioned relative to the conveyor. Alternatively, the image acquisition application 209 may acquire the images 215 via a networked data store or service.

The OCR application 212 is executed to recognize text contained within the images 215. The OCR application 212 may be structured using a plurality of engines corresponding to different stages or procedures in processing an image 215 for recognition. In various embodiments, the OCR application 212 may include an image preprocessing engine 218, a text detection engine 221, a gap shifting engine 224, a text recognition engine 227, a text aggregation engine 230, a presentation engine 233, and/or other components.

The image preprocessing engine 218 can be executed to perform various preprocessing functions on images 215. Such preprocessing functions may include, for example, denoising, dewarping, rotating, adjusting brightness, adjusting contrast, converting to grayscale, cropping, and other functions aimed at preparing the images 215 for recognition.

The text detection engine 221 can be executed to perform text detection on images 215. In so doing, the text detection engine 221 may create a binary mask for the image 215 that identifies text areas and non-text areas to the text recognition engine 227. One commercially available example of a text detection engine 221 is the Open Source Computer Vision Library (OpenCV).

The gap shifting engine 224 can be executed to perform gap shifting upon the resultant regions identified by the text detection engine 221 that are likely to contain text. The text detection engine 221 may be configured to repeat the text detection process once the gap shifting process has completed.

The text recognition engine 227 can be executed to recognize character strings in various fonts within the text areas identified by the text detection engine 221. One open-source example of a text recognition engine 227 is Tesseract OCR by GOOGLE.

The text aggregation engine 230 can be executed to map the text extracted by the text recognition engine 227 to expected categories. For instance, with respect to the "Nutrition Facts" example, if "total fat" is extracted from the image 215, the text value recognized immediately to the right of "total fat" may be mapped to a predetermined "total fat" category. The text aggregation engine 230 may also apply text replacement rules, which may include spelling correction, grammar correction, word correction, and so on. The text replacement rules may be based at least in part on the context of the extracted text within the image 215.

The presentation engine 233 can be executed to generate presentations of the extracted text. For example, the presentations may correspond to raster images, hypertext markup language (HTML) documents, extensible markup language (XML) documents, word processing documents, spreadsheet documents, and so on. The presentation engine 233 may be configured to recreate the arrangement of text within the original image 215, thereby undoing various modifications as performed for text recognition purposes (e.g., rotation transformations, de-warping transformations, gap shifting, etc.).

The data stored in the data store 206 includes, for example, images 215, modified images 235, text detection regions 236, gap shifting regions 239, extracted text 242, text presentations 245, rules 248, and potentially other data. The images 215 correspond to photos, scans, and/or other raster images of text that may be in a tabular form. Tabular text can be organized into multiple rows and columns, perhaps including headings, shading, and border elements. In some cases, the images 215 may include various artifacts such as noise, a warped or skewed perspective, distortions, and so on. The images 215 may be in black and white, halftone, grayscale, or color. The modified images 235 may correspond to versions of the images 215 that have been modified by the gap shifting engine 224 by way of application of a gap shifting process. A modified image 235 may correspond to an entirety of an image 215 or a portion of the image 215.

The text detection regions 236 correspond to regions within the images 215 that correspond to text detected by the text detection engine 221. For example, the text detection regions 236 may correspond to bounding boxes around words, letters, glyphs, symbols, or other content that appears to be text. The gap shifting regions 239 are regions of the images 215 that are located generally horizontally between or adjacent to text detection regions 236. The gap shifting regions 239 are in line with one or more text detection regions 236. In this regard, the gap shifting regions 239 may be collinear to the text detection regions 236 or the gap shifting regions 239 may be curvilinear in line with the text detection regions 236, where text is rendered in a curvilinear line. The gap shifting regions 239 were not detected by the text detection engine 221 upon initial execution but are predicted by the gap shifting engine 224 to contain text. Each gap shifting region 239 may be associated with an amount by which the gap shifting region 239 is shifted left or right in the image 215.

The extracted text 242 corresponds to character strings extracted by the text recognition engine 227 from the text detection regions 236. The extracted text 242 may be further processed by the text aggregation engine 230 to correct errors. The text presentations 245 may correspond to raster images, HTML elements, XML elements, word processing documents, spreadsheet documents, and so on, that are generated by the presentation engine 233 to be a representation of the content in the image 215. For example, where the image 215 contains tabular text, the text presentation 245 may correspond to an HTML table. In generating the text presentations 245, the presentation engine 233 may preserve the original formatting of the text in the image 215, which may involve undoing transformations applied during the text detection and recognition process, such as undoing gap shifting transformations.

The rules 248 configure the operation of the text aggregation engine 230. To this end, the rules 248 may include text replacement rules that correct spelling, grammar, and incorrect words based at least in part on expected context for the image 215. The rules 248 may also include configuration parameters that control the operation of the components of the OCR application 212. Such parameters may include thresholds for detection or recognition, preprocessing parameters, scaling parameters, constant values, and other parameters.

Figure 3:
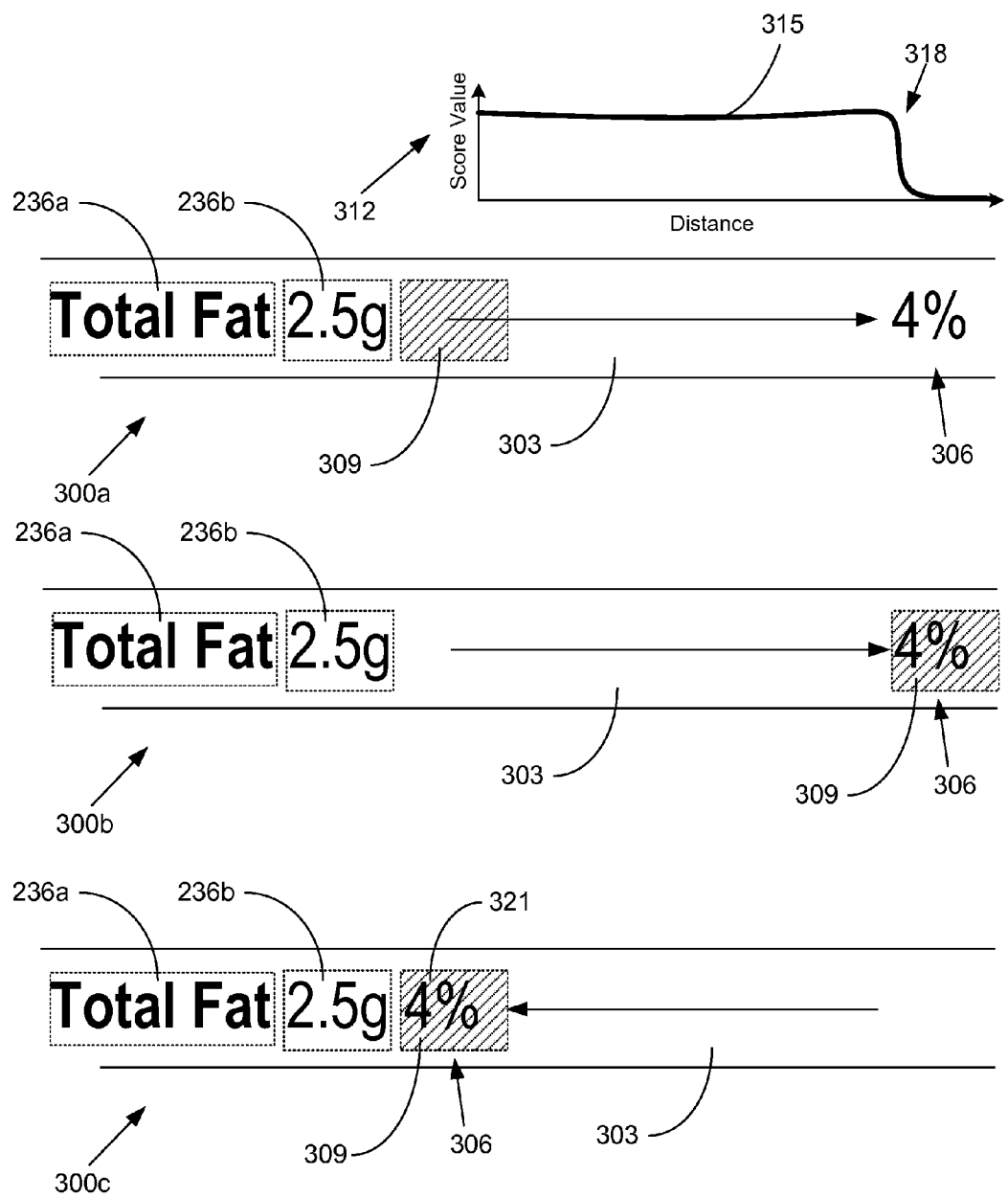
FIG. 3 is a pictorial diagram that depicts an operation of a gap shifting engine executed in the computing environment of FIG. 2 according to various embodiments.

Turning now to FIG. 3, shown are pictorial diagrams 300a, 300b, and 300c that depict an operation of the gap shifting engine 224 (FIG. 2) according to various embodiments. The pictorial diagram 300a includes a sample row 303 from an example "Nutrition Facts" label. In this sample row 303, the left-justified text ("Total Fat 2.5 g") has been detected by the text detection engine 221 and is indicated as being in two text detection regions 236a and 236b. The right-justified text 306 ("4%") has not yet been detected by the text detection engine 221 in this example.

A detection window 309 used by the gap shifting engine 224 is initially located adjacent to the text detection region 236b. The gap shifting engine 224 may slide the detection window 309 linearly until the right-justified text 306 may begin to be detected.

The pictorial diagram 300a also includes a graph 312 of a score versus distance for the detection window 309. In this example, the score may correspond to a grayscale value computed for the detection window 309, but in other examples, the score may relate to the number of edges, a specific color, a background color, a background texture, or another metric. While the detection window 309 is analyzing whitespace, the grayscale value is near white, as illustrated by plot portion 315. However, when the detection window 309 slides over the right-justified text 306, as illustrated by the pictorial diagram 300b, the grayscale value drops to black, as indicated by plot portion 318. Where the score relates to a grayscale value, the values upon which the graph 312 is based may correspond to a minimum grayscale value, a maximum grayscale value, a mean grayscale value, or some other measurement of grayscale values.

Based upon the scores represented in the graph 312, the detection window 309 may be deemed a gap shifting region 239 (FIG. 2), and the raster content 321 that starts from the score value drop point may be linearly shifted to the initial position of the detection window 309 as shown in the pictorial diagram 300c. After this raster content 321 shifting occurs, the text detection engine 221 may be executed again on the image 215, thereby detecting the right-justified text 306 that has been shifted.

Figure 4:
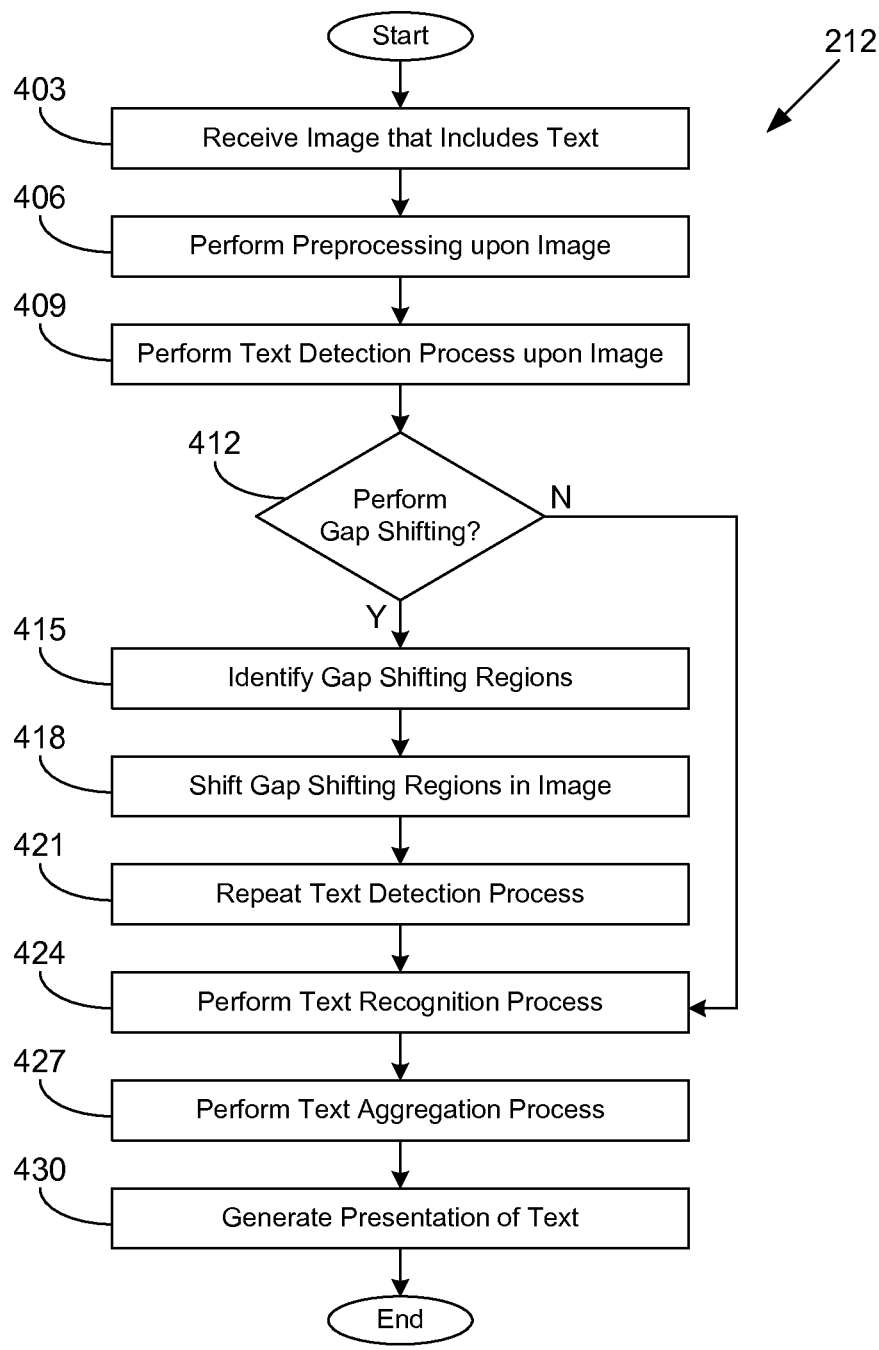
FIG. 4 is a flowchart illustrating one example of functionality implemented as portions of an optical character recognition (OCR) application executed in the computing environment of FIG. 2 according to various embodiments of the present disclosure.

Referring next to FIG. 4, shown is a flowchart that provides one example of the operation of a portion of the OCR application 212 according to various embodiments. It is understood that the flowchart of FIG. 4 provides merely an example of the many different types of functional arrangements that may be employed to implement the operation of the portion of the OCR application 212 as described herein. As an alternative, the flowchart of FIG. 4 may be viewed as depicting an example of elements of a method implemented in the computing environment 203 (FIG. 2) according to one or more embodiments.

Beginning with box 403, the OCR application 212 receives an image 215 (FIG. 2) that includes text from the image acquisition application 209 (FIG. 2). Alternatively, the OCR application 212 may load an image 215 from the data store 206 (FIG. 2). In box 406, the OCR application 212 optionally performs preprocessing upon the image 215. For example, if the image 215 is rotated, skewed, distorted, or contains artifacts, the OCR application 212 may execute the image preprocessing engine 218 (FIG. 2) to perform one or more preprocessing tasks (e.g., dewarping, rotation, denoising, etc.). One object may be to place the text in the image 215 in a horizontal orientation. The preprocessing tasks and parameters may be recorded so as to enable reversing the tasks if desired. For example, if the image 215 is rotated 45 degrees in order to horizontally orient the text, the 45 degree rotation may be recorded so that a corresponding −45 degree rotation may be later performed relative to the text.

In box 409, the OCR application 212 executes the text detection engine 221 (FIG. 2) to perform a text detection process upon the image 215. The text detection process identifies text detection regions 236 (FIG. 2) that correspond to regions of the image 215 that are determined to contain text. In box 412, the OCR application 212 determines whether gap shifting is to be performed. In this determination, the OCR application 212 may assess whether the image 215 corresponds to tabular text or other text that may benefit from gap shifting to improve the OCR process. For example, the OCR application 212 may identify whether the image 215 includes horizontal lines or horizontal rules that may indicate tabular text. Alternatively, the OCR application 212 may proceed with text recognition and then determine according to the rules 248 (FIG. 2) that some expected data was not recognized, and in this case, perform gap shifting. In some cases, the images 215 may be manually selected for gap shifting to be applied.

If gap shifting is to be applied, the OCR application 212 moves from box 412 to box 415. In box 415, the OCR application 212 executes the gap shifting engine 224 (FIG. 2) to identify one or more gap shifting regions 239 (FIG. 2). For example, a gap shifting region 239 may be identified relative to the last text detection region 236 on a row (i.e., the gap shifting region 239 and the text detection region 236 are collinear). In one implementation, the width of the gap shifting region 239 may be defined as a function of the height of an adjacent text detection region 236. For instance, the height of the text detection region 236 may be multiplied by a scaling factor.

A sliding window approach as discussed with respect to FIG. 3 may be employed to correctly place the gap shifting region 239 over undetected text on the row. This region is a region of the image 215 where text has not been detected by the initial pass of the text detection engine 221. For example, a minimum score value, a maximum score value, a mean score value, or some other approach may be employed to correctly locate the gap shifting region 239. It is noted that a gap shifting region 239 may be identified to the left of a text detection region 236 or to the right of a text detection region 236 for text written left to right. Where unidentified text is in multiple columns, multiple gap shifting regions 239 may be identified for a given row.

In box 418, the OCR application 212 shifts the identified gap shifting regions 239 for the image 215, thereby creating a modified image 235 (FIG. 2). This involves copying the raster content in a gap shifting region 239 and moving it to the left or right in line with the text detection region 236. It is noted that text may sometimes be rendered in other than a horizontal line (e.g., a curvilinear line, a slanted line, a skewed line, following the boundary of a polygon or another shape, etc.), and the shifting may be performed according to the line in which the text is rendered. To this end, a procedure for determining the manner in which the text is rendered may be employed. In shifting the raster content, the raster content is moved within the image 215 to be adjacent to a text detection region 236, thereby reducing the gap or whitespace between the text detection region 236 and the undetected text.

In box 421, the OCR application 212 repeats the text detection process via the text detection engine 221 upon the modified image 235. In some embodiments, the text detection process may be repeated only on a subset of the modified image 235 (e.g., a portion of the image 215 corresponding to a row where gap shifting has been performed). On this subsequent pass, the text detection engine 221 is more likely to identify the text content of the linearly shifted gap shifting region 239. The OCR application 212 then continues to box 424. If gap shifting is not to be performed for the image 215, the OCR application 212 moves from box 412 to box 424.

In box 424, the OCR application 212 executes the text recognition engine 227 (FIG. 2) to recognize text within the text detection region 236 for the original image 215, or the modified image 235 if gap shifting has been performed. For example, the text recognition engine 227 may compare the glyphs or letters in the text detection region 236 with predetermined glyphs or letters of various fonts to determine whether a match occurs.

In box 427, the OCR application 212 performs a text aggregation process via the text aggregation engine 230 to aggregate the extracted text 242 (FIG. 2), which includes character strings. In so doing, the text aggregation engine 230 may apply various rules 248 that result in text replacements being performed to correct misidentified words, misidentified letters, and so on. Text within the same row may be grouped. With respect to the non-limiting "Nutrition Facts" example, a nutrition word token may be recognized as a predetermined valid word. If other words are recognized, they may be corrected to a nearest valid word.

In box 430, the OCR application 212 generates a text presentation 245 (FIG. 2) of the extracted text 242 via the presentation engine 233. In this regard, the presentation engine 233 may reconstruct the formatting of the text as originally presented in the image 215. For example, if the image 215 has been rotated, a reverse rotation may be performed in presenting the text in the text presentation 245. Similarly, where gap shifting is applied, a whitespace gap, a background color or texture gap, or another visual separation may be reconstructed based at least in part on the amount of linear shift that was applied by the gap shifting engine 224. The text may be saved within a data store 206 so as to be structured and searchable. Thereafter, the operation of the portion of the OCR application 212 ends.

According to one embodiment, the operation of portions of the above-described flowchart of FIG. 4 may be implemented based on the following pseudo-code:

```
0. DEF_WORD_SPACING=5 // a constant factor in pixels
1. P1=COORDINATES OF THE FIRST DETECTED BOX ON THIS ROW;
   P2=COORDINATES OF THE LAST DETECTED BOX ON THIS ROW
2. IMAGE_ROW=CUT IMAGE OF THIS ROW
3. WINDOW_WIDTH=P1.HEIGHT
4. GAP_START=P2.END
5. DIFF_ARRAY=ARRAY[LENGTH(IMAGE_ROW)]
6. PREVIOUS_WINDOW_MIN=0
   FOR I FROM GAP_START TO ROW_END
     WINDOW=IMAGE_ROW[RANGE(I,I+WINDOW_WIDTH),
        RANGE(0,ROW_HEIGHT)]
     CURRENT_WINDOW_MIN=MIN_GRAYSCALE(WINDOW)
     DIFF_ARRAY[I-GAP_START]=PREVIOUS_WINDOW_MIN-CURRENT_WINDOW_MIN
     PREVIOUS_WINDOW_MIN=CURRENT_WINDOW_MIN
   END
7. MAX_DIFF=MAX(DIFF_ARRAY);
   SMALL_TEXT_START=INDEX(MAX_DIFF)
8. IF SMALL_TEXT_START<ROW_END AND
     SMALL_TEXT_START-GAP_START>DEF_WORD_SPACING
     SMALL_TEXT_PORTION=IMAGE_ROW[RANGE(SMALL_TEXT_START,ROW_END),
        RANGE(0,ROW_HEIGHT)]
     PORTION_AFTER_P2=IMAGE_ROW[RANGE(GAP_START,ROW_END),
        RANGE(0,ROW_HEIGHT)]
     COPY_SMALL_TEXT_PORTION TO PORTION_AFTER_P2
     ASSIGN WHITE PIXELS TO SMALL_TEXT_PORTION
   END
```

Figure 5:
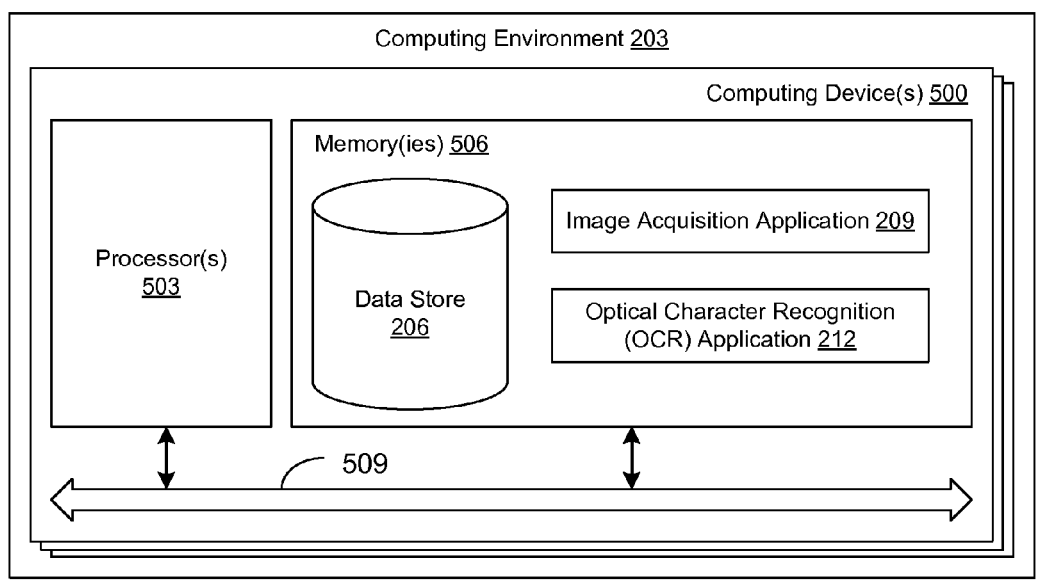
FIG. 5 is a schematic block diagram that provides another example illustration of the computing environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer, client computer, or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the image acquisition application 209, the OCR application 212, and potentially other applications. Also stored in the memory 506 may be a data store 206 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although he image acquisition application 209, the OCR application 212, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the OCR application 212. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image acquisition application 209 and the OCR application 212, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the image acquisition application 209 and the OCR application 212, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500 or in multiple computing devices 500 in the same computing environment 203. Additionally, it is understood that terms such as "application,"

"service," "system," "engine," "module," and so on may be interchangeable and are not intended to be limiting relative to one another.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device that comprises a processor and a memory, wherein the program, when executed, causes the at least one computing device to at least:
    receive an image that includes text in a tabular form;
    perform an automated text detection process upon the image to detect a first region of text in a row;
    determine a second region in which the automated text detection process failed to detect text that is also in the row;
    shift the second region to reduce a whitespace gap between the first region and the second region, thereby creating a modified image;
    perform the automated text detection process upon the modified image to detect text in the second region;
    perform an automated text recognition process on the first region and the second region to determine a first character string from the first region and a second character string from the second region; and
    generate a representation of the text in the tabular form, wherein the first character string is visually separated from the second character string according to an amount of whitespace by which the second region was linearly shifted.

2. The non-transitory computer-readable medium of claim 1, wherein the row corresponds to one of a plurality of rows in the tabular form.

3. The non-transitory computer-readable medium of claim 1, wherein a location of the second region is identified based at least in part on a score value in a third region adjacent to the first region in the row.

4. A system, comprising:
    at least one computing device comprising a processor and a memory; and
    at least one application executed in the at least one computing device, the at least one application causing the at least one computing device to at least:
        perform an automated text detection process upon an image to detect a first region of text;
        determine a second region in which the automated text detection process failed to detect text;
        shift the second region relative to the first region to reduce a gap between the first region and the second region, thereby creating a modified image; and
        perform the automated text detection process upon the modified image.

5. The system of claim 4, wherein the at least one application further causes the at least one computing device to determine a width of the second region as a function of a height of the first region.

6. The system of claim 4, wherein the at least one application further causes the at least one computing device to at least shift a third region in line with the first region to reduce a gap between the second region and the third region.

7. The system of claim 4, wherein the automated text detection process indicates that the second region contains no text when the automated text detection process is initially performed upon the image.

8. The system of claim 7, wherein the automated text detection process indicates that the second region contains text when the automated text detection process is subsequently performed upon the modified image.

9. The system of claim 4, wherein the image is an image of printed tabular text.

10. The system of claim 4, wherein the at least one application further causes the at least one computing device to at least transform the image before initially performing the automated text detection process.

11. The system of claim 4, wherein the at least one application further causes the at least one computing device to at least perform denoising on the image before initially performing the automated text detection process.

12. The system of claim 4, wherein the at least one application further causes the at least one computing device to at least perform an automated text recognition process on the first region and on the second region that has been shifted, the automated text recognition process thereby identifying a first character string in the first region and a second character string in the second region.

13. The system of claim 12, wherein the at least one application further causes the at least one computing device to at least replace the first character string with a third character string according to a text replacement rule.

14. The system of claim 12, wherein the at least one application further causes the at least one computing device to at least generate a representation of text recognized by the text recognition process, wherein the first character string and the second character string are visually separated in the representation by a gap approximating the gap between the first region and the second region.

15. A method, comprising:
    receiving, by at least one computing device comprising a processor and a memory, an image that includes text;
    performing, by the at least one computing device, an automated text detection process upon the image to detect a first region of text;
    determining, by the at least one computing device, a second region in which the automated text detection process failed to detect text that is in line with the first region of text;
    shifting, by the at least one computing device, the second region to reduce a gap between the first region and the second region, thereby creating a modified image; and
    performing, by the at least one computing device, the automated text detection process upon the modified image.

16. The method of claim 15, further comprising detecting, by the at least one computing device, a third region of text at least partially overlapping the second region via the automated text detection process that has been performed on the modified image.

17. The method of claim 16, further comprising performing, by the least one computing device, an automated text recognition process upon the first region and the third region to identify a first character string within the first region and a second character string within the second region.

18. The method of claim 17, further comprising:
determining, by the at least one computing device, a visual separation between the first character string and the second character string according to an amount by which the second region was shifted; and
generating, by the at least one computing device, a presentation of the first character string and the second character string that includes the visual separation.

19. The method of claim 15, wherein determining the second region further comprises determining a width of the second region as a function of a height of the first region.

20. The method of claim 15, wherein determining the second region further comprises determining a location of the second region according to a score value within a third region that is collinear with the first region.

* * * * *